W. H. HAWLEY.
HEATER.
APPLICATION FILED FEB. 8, 1921.

1,409,854.

Patented Mar. 14, 1922.

WITNESS:
L. B. James

William H. Hawley
INVENTOR

BY Victor J. Evans
ATTORNEY

UNITED STATES PATENT OFFICE.

WILLIAM H. HAWLEY, OF SOUTH BEND, INDIANA, ASSIGNOR TO AUTO WATER HEATER CORPORATION, OF NEW YORK, N. Y., A CORPORATION OF NEW YORK.

HEATER.

1,409,854.  Specification of Letters Patent.  Patented Mar. 14, 1922.

Application filed February 8, 1921. Serial No. 443,373.

*To all whom it may concern:*

Be it known that I, WILLIAM H. HAWLEY, a citizen of the United States, residing at South Bend, in the county of St. Joseph and State of Indiana, have invented new and useful Improvements in Heaters, of which the following is a specification.

This invention relates to improvements in automobiles and has for an object the provision of a heater which may be attached beneath the hood of an automobile for the purpose of facilitating starting of an internal combustion engine in cold weather or under other adverse conditions.

Another object of the invention is the provision of a heater which will heat the water of the engine cooling system so as to maintain it at a proper temperature to render starting easy and in addition maintain the temperature within the engine hood relatively high and thus insure proper operation under all conditions.

Another object is the provision of a heater for this purpose which utilizes a protected flame and thus relieves the battery of the ignition system from excessive use, as in electric heaters for this purpose, the protection of the flame being such as to avoid liability of fire from the accidental ignition of gasoline or other fuels.

A further object is the provision of a device of this character which may be controlled from the instrument board of the vehicle, so that the driver may light or extinguish the heater and determine its condition without leaving his seat.

A still further object is the provision of a heater which is exceedingly simple in construction, positive and economical in operation and which may be easily installed.

With the above and other objects in view, the invention further includes the following novel features and details of construction, to be hereinafter more fully described, illustrated in the accompanying drawings and pointed out in the appended claims.

In the drawings:—

Figure 1:
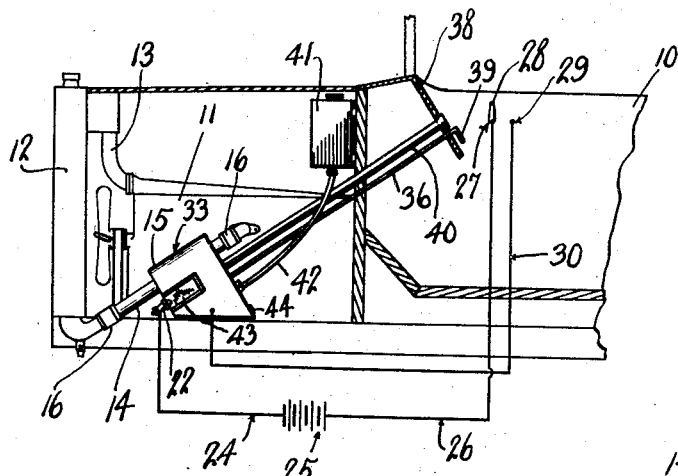
Figure 1 is a fragmentary section through a portion of an automobile with the invention applied thereto, parts also being shown in side elevation.
Figure 2:
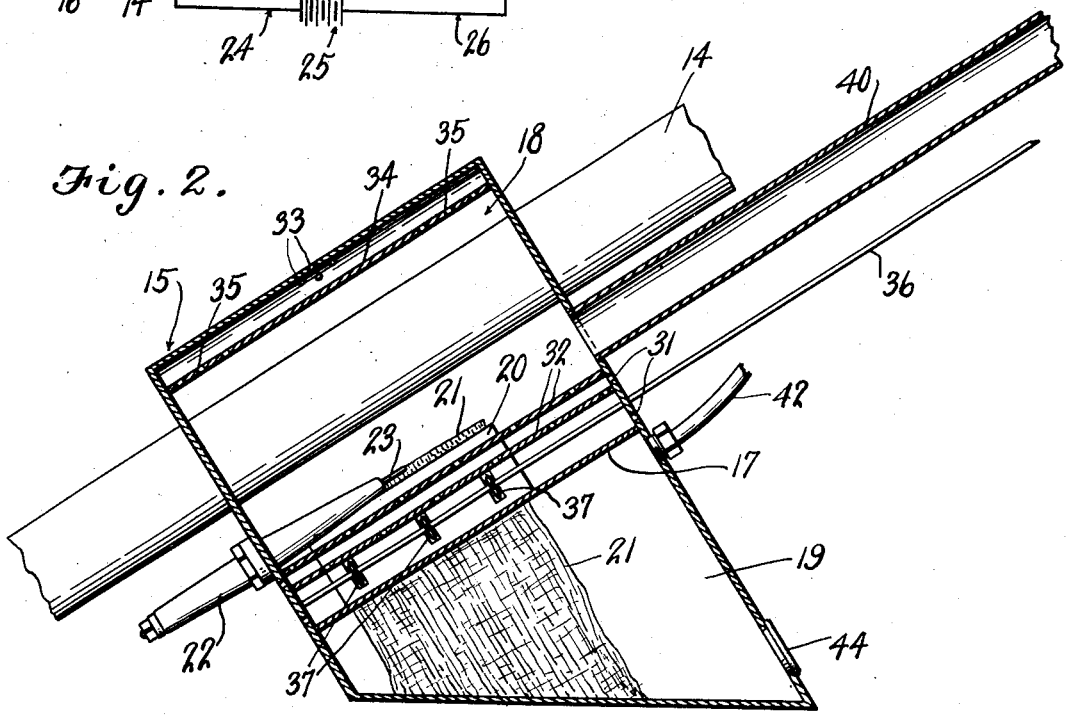
Figure 2 is an enlarged detail sectional view through the heater.
Figure 3:
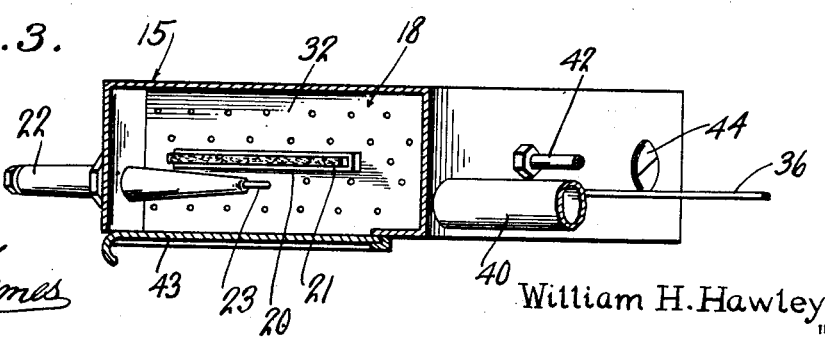
Figure 3 is a horizontal sectional view.

Referring specifically to the drawings, wherein like characters of reference denote corresponding parts, the reference character 10 indicates a fragmentary portion of an automobile which is equipped with an internal combustion engine indicated at 11. The engine is equipped with the usual water cooling system and includes a radiator 12, a pipe which conducts the water from the bottom of the radiator into the cylinder jacket and a return pipe 13.

In the present invention the first mentioned pipe (that is, the pipe which conducts the water from the bottom of the radiator into the cylinder jacket) has substituted therefor a pipe 14, which is surrounded by and connected to a casing 15, the said pipe 14 being connected by coupling devices 16 at each end thereof. The purpose of substituting the pipe 14 for the one usually employed in water circulating systems is to provide a complete unit, which may be readily and quickly secured in place, the said pipe 14 being attached to and forming a unitary part of the device.

The casing 15 is divided by a partition 17 into a heat chamber 18, through which the pipe 14 passes and a fuel compartment or fount 19. The partition 17 is provided with an elongated opening, from which extends a wick tube or guide 20 and operating within this tube or guide is a wick 21, one end of which is positioned within the front 19, while its opposite end extends within the heat chamber 18, where it is adapted to be ignited for the purpose of supplying heat to the pipe 14 and thereby heat the water cooling system.

An ignition device, herein shown in the form of a spark plug 22, extends within the heat chamber 18 and has its power electrode 23 arranged in proper juxtaposition to the wick tube or guide 20, the latter forming the ground electrode for the plug and providing a spark gap. The plug 22 is preferably included in the usual ignition circuit, but for purposes of illustration, it is shown as connected by means of a conductor 24 with a battery 25, while the latter is connected by means of a conductor 26 to one terminal 27 of a switch 28. The opposite terminal 29 of this switch is connected by a conductor 30 to the casing 15, so that current will pass from one side of the battery 25 through the plug 22 and will jump the gap between the power electrode 23 and be grounded through the wick tube and casing 15 from where it will pass through the conductor 30 to the switch 28 when the latter is closed, back to the battery through the conductor 26.

For the purpose of supplying fresh air to the flame of the wick to facilitate combustion, the casing 15 is formed with air inlet openings 31, by means of which air is admitted to the heat chamber 18 through foraminous or perforated plates 32 which surround the wick tube 20. The heated air thus circulates around the pipe 14 and heats the water passing through said pipe, circulation of air through the heat chamber being assured by providing outlet openings 33 in the top of the casing 15. In order to thoroughly protect the flame so as to prevent waste gasoline or other fuel from reaching, there is provided a plurality of the plates 32, while the upper end of the heat chamber has located therein a perforated partition 34, the perforations 35 of which are positioned out of alignment with the perforations 33, so that all air in entering or leaving the chamber 18 must pursue a circuitous path.

Extending within the casing 15 is a rotatably mounted rod 36, which is provided upon the interior of the said casing with star or other toothed wheels 37, the latter being adapted to engage the wick 21 so as to regulate the flame, as will be readily understood. The rod 36 preferably extends upward through the vehicle instrument board 38, where it is provided with an operating handle 39, so that the flame may be controlled by the driver without leaving his seat. In order to determine the condition of the flame, there is provided a sight tube 40, which extends from the instrument board 38 and enters the heat chamber 18. The size of the flame may thus be nicely regulated so that the degree of heat may be controlled as required.

Owing to the restricted space within the vehicle hood, it is preferred to provide an auxiliary fuel reservoir 41 which may be attached to the dash board directly beneath the board and from which fuel may be supplied to the fount 19 by means of a pipe 42. In addition, the casing is provided with a slide controlled opening 43, by means of which access may be had to the interior of the heat chamber for cleaning the wick and for other purposes, while a plug closed opening 44 is provided in the fount 19, so that the opposite end of the wick may be reached when necessary.

It will be apparent from the foregoing description and the accompanying drawings, that the invention provides an exceedingly simple and effective heater which may be easily installed upon a motor vehicle and operated at an exceedingly low cost.

The invention is susceptible of various changes in its form, proportions and minor details of construction and the right is herein reserved to make such changes as properly fall within the scope of the appended claims.

Having described the invention what is claimed is:—

1. In combination with a water pipe, of a casing surrounding said pipe and provided with a plurality of openings in the top and sides thereof, a partition located in said casing and provided with an elongated opening, a guide member extending from said partition, surrounding said elongated opening and provided with a plurality of spaced openings, a wick extending through said guide member, an ignition device extending through said casing adjacent to said wick, means for supplying fuel to said casing, a plurality of spaced perforated plates located in said casing on one side of said pipe and surrounding said guide member, a plate located in said casing upon the opposite side of said pipe and provided with a plurality of openings in the opposite ends thereof, a rotatably mounted rod extending through said casing, and a plurality of toothed wheels secured to said rod, extending through the openings in said guide member and engaging said wick.

2. In combination with a water pipe, of a casing surrounding said pipe and provided with a plurality of openings, a partition located in said casing and provided with an elongated opening, a guide member extending from said partition, surrounding said opening and provided with a plurality of spaced openings, a wick extending through said guide member, an ignition device extending through said casing and adjacent to said wick, means for supplying fuel to said casing, a plurality of spaced plates located in said casing on opposite sides of said pipe and provided with a plurality of openings, a rotatably mounted rod extending through said casing, a plurality of toothed wheels secured to said rod and engaging said wick, and a sight tube extending from one side of said casing adjacent to one end of said wick.

In testimony whereof I affix my signature.

WILLIAM H. HAWLEY.